July 11, 1950     P. C. McLEMORE     2,514,890
METHOD OF PLANTING

Filed Aug. 17, 1945     5 Sheets-Sheet 1

INVENTOR.
Price C. McLemore

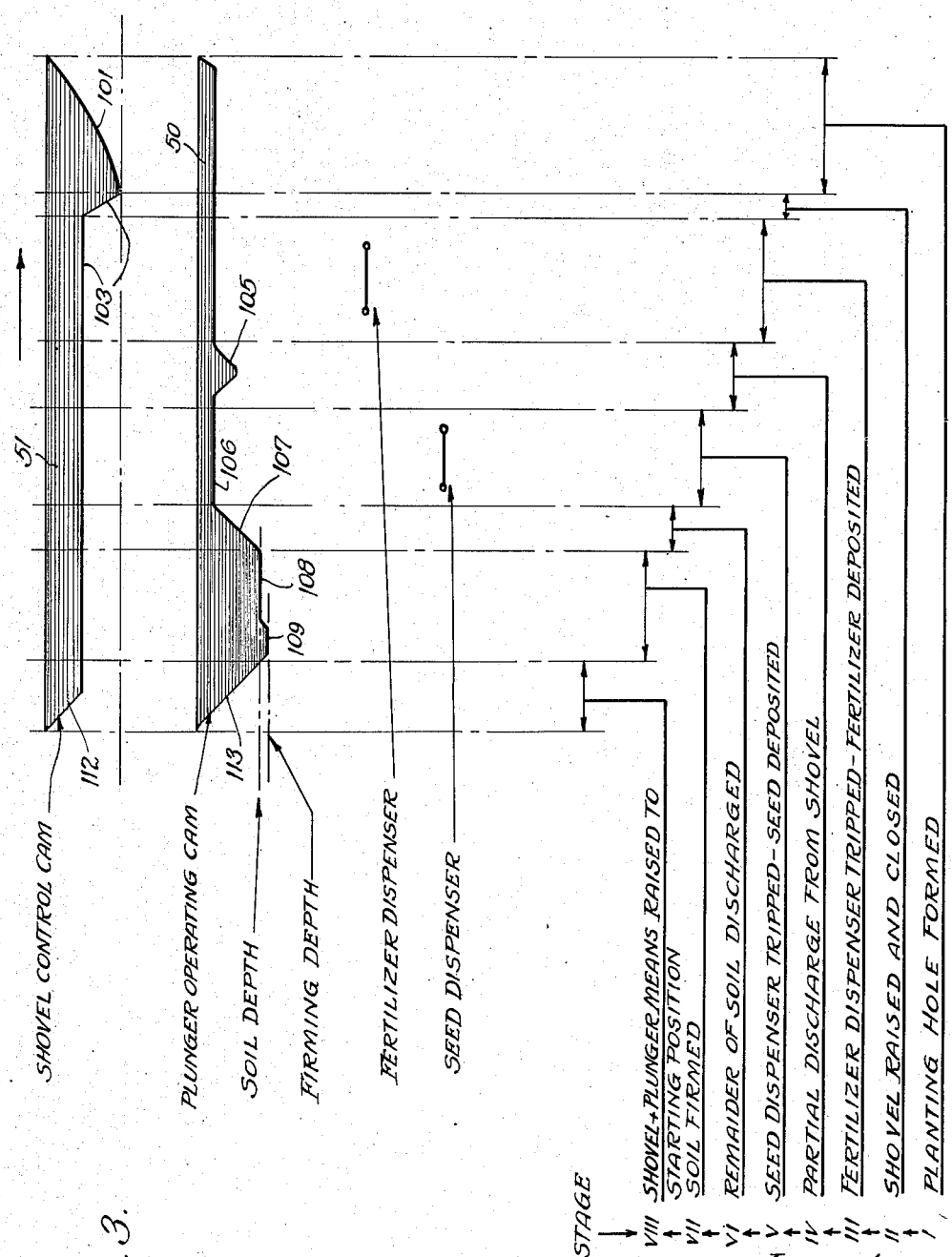

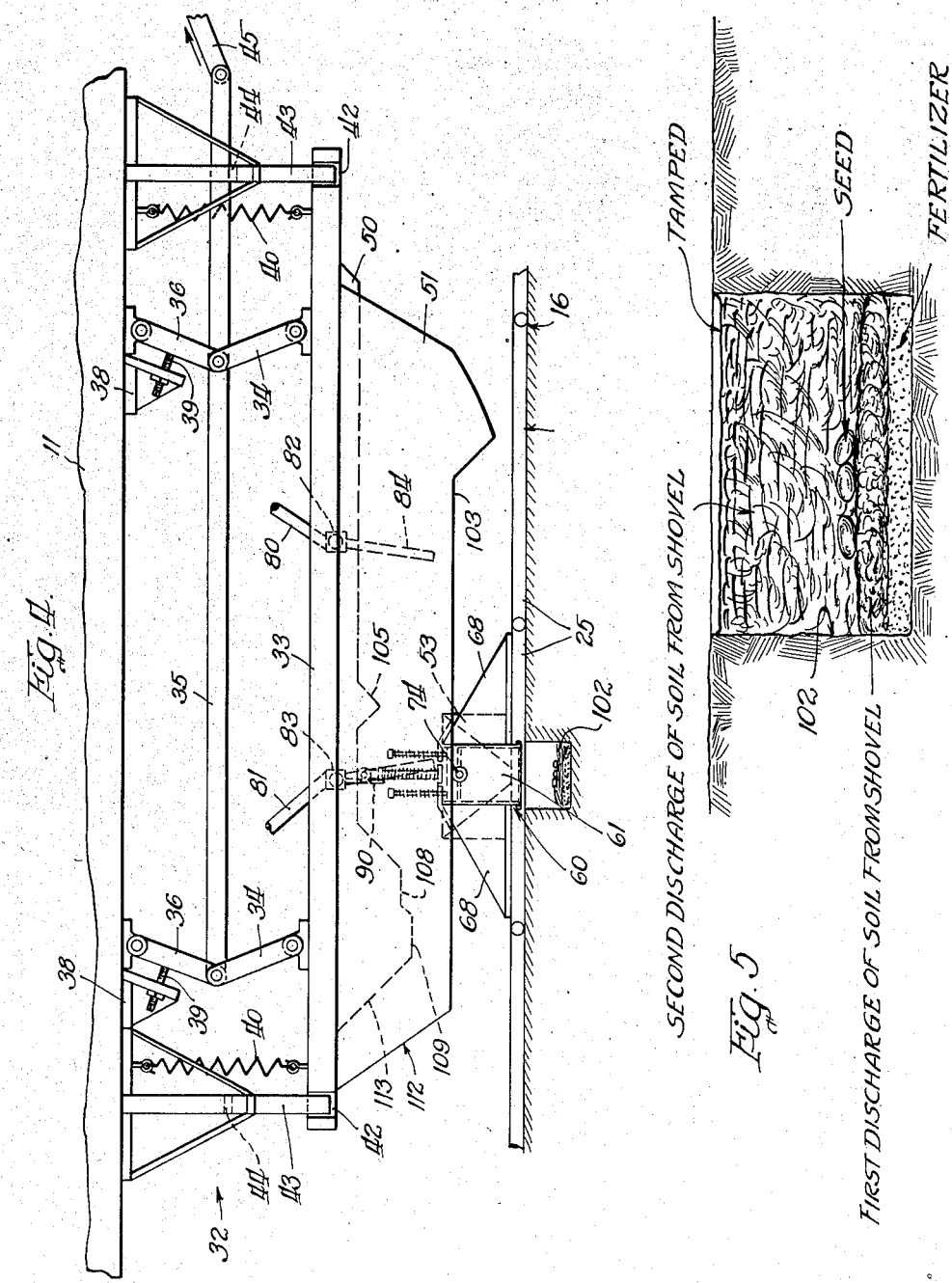

July 11, 1950 P. C. McLEMORE 2,514,890
METHOD OF PLANTING
Filed Aug. 17, 1945 5 Sheets-Sheet 4
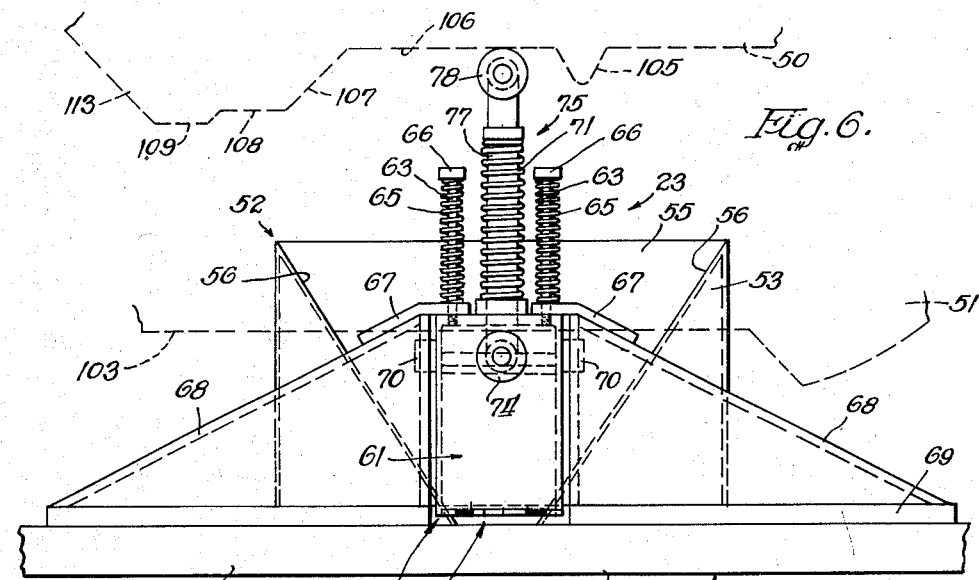
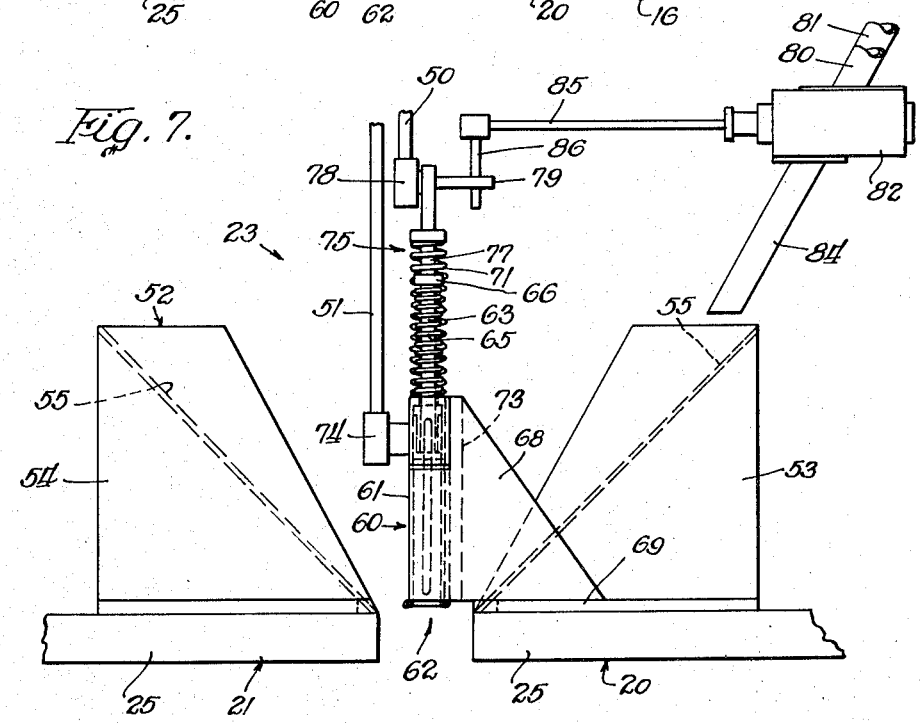
Inventor:
Price C. McLemore.

July 11, 1950     P. C. McLEMORE     2,514,890
METHOD OF PLANTING
Filed Aug. 17, 1945     5 Sheets-Sheet 5
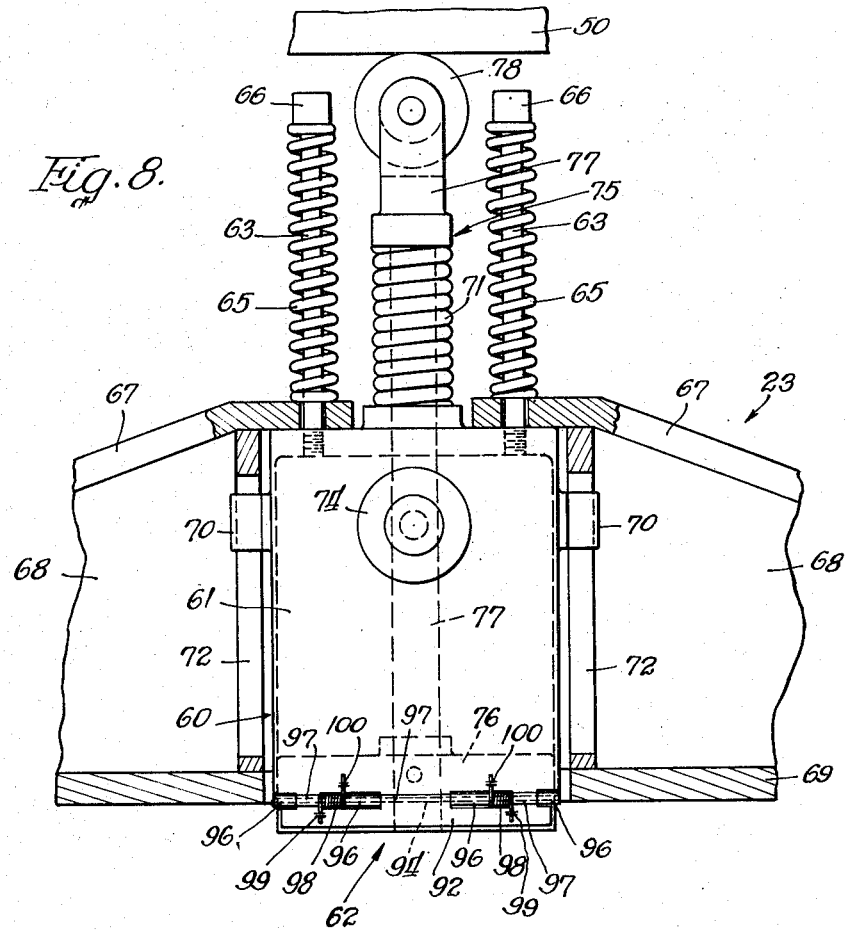
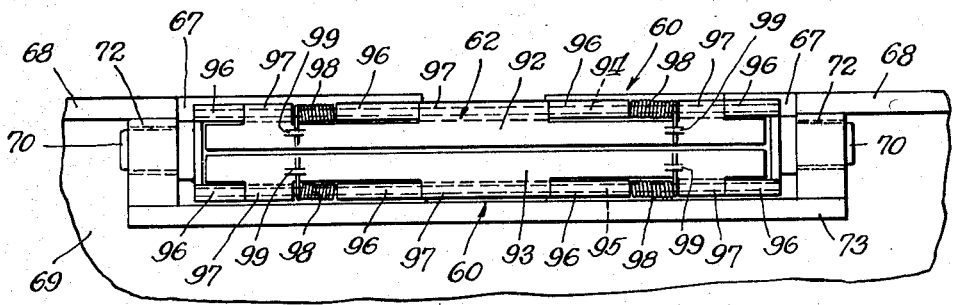
Inventor:
Price C. McLemore Patented July 11, 1950

2,514,890

UNITED STATES PATENT OFFICE 2,514,890

METHOD OF PLANTING

Price C. McLemore, Montgomery, Ala.

Application August 17, 1945, Serial No. 610,963

1 Claim. (Cl. 47—58)

My present invention relates to an improvement in a method of planting.

It is known that when ground is plowed that the soil is infested to the depth of the plow sole with a collection of weed seeds which have accumulated on the ground surface prior to plowing, and a large number of these weeds near the surface will thereafter proceed to germinate. Thus, in the plowing and harrowing of ground preparatory to planting and also in subsequent mechanical cultivation of the ground after the plants have started to grow, weed seeds are unwittingly conditioned to germinate to the detriment of the crop being raised. In my Patent No. 2,327,204, dated August 17, 1943, I have disclosed a method of flame cultivating crops which avoids this undesirable feature of mechanically stirring up the ground for cultivation purposes. However, the further undesirable feature of the conditioning of weed seeds by plowing of a field preparatory to planting still remains.

It is an object of my present invention to provide a method of planting in which weed seeds placed in a zone of germinating environment as by plowing of the ground are caused to be rendered substantially ineffective.

I propose to accomplish the aforesaid object by first conditioning a field for an agricultural crop grown from seed by plowing the field broadcast and leaving it as flat as possible. Such plowing in most climates is normally done in the fall or early winter season. After such initial plowing the field is left undisturbed. Most obnoxious vegetation such as the grasses are hardy and usually withstand cold and winter weather so that by planting time they have begun to sprout. In the normal planting time of cotton, for example, such volunteer or obnoxious vegetation will usually begin to appear about from six weeks to two months before planting time. In order to destroy such objectionable volunteer vegetation I propose to flame the field one or more times during the interval between the time the volunteer vegetation begins to appear and the time for planting. This flaming of the field may be accomplished with the apparatus disclosed in my aforesaid patent or my Patent No. 2,369,154, dated February 13, 1945, or any other suitable apparatus for bathing the ground in flames of sufficient intensity and length of time to effect destruction of the growing weeds. This flaming of the ground should be accomplished with the least possible disturbance to the soil so that other weed seeds are not placed in a position to grow. The number of times flaming is necessary is largely dependent upon the amount of obnoxious vegetation present, the rapidity of its growth and the soil and climate conditions. In general it may vary from one to four times. In this manner substantially all obnoxious vegetation is removed or destroyed by flaming prior to the time the crop is to be planted. The field as thus prepared is now ready for planting of the crop seed, and in order not to impair the benefit of the prior flame treatment of the field it is desirable to effect the planting of the crop seeds with the least amount of disturbance to the soil so that a minimum of weed seeds are brought to a zone from which they may germinate.

It is also the practice of many growers to plant hairy vetch, Austrian peas, etc., in the fall and to plow them under in the spring prior to planting of a spring crop. Usually an interval of about ten days to two weeks is allowed to elapse between the plowing under of the cover crop and the subsequent planting of a spring crop. In such cases the field prior to planting of the crop seed may be bathed in flames as previously described during this interval of ten days to two weeks since volunteer vegetation will in most cases have begun to appear before planting time. Further the field may be bathed in flames immediately after the crop seeds have been planted and at intervals thereafter as may be necessary or desired until such time as the crop seeds sprout.

A further object of my invention is to plant crop seed in a field prepared as above described by disturbing the soil substantially only in an area necessary to accomplish planting of the crop seed.

I propose to accomplish the latter object by first forming a planting hole of an area and depth sufficient for depositing the crop seed without unduly disturbing the surrounding soil. After the crop seed is deposited in the planting hole the soil removed in forming the latter is preferably returned to the planting hole to fill the same. The preferred practice of the method of my invention after the plowing and flaming of a field as aforesaid comprises the steps of forming a planting hole of minimum area and depth, depositing a suitable fertilizer in the planting hole, returning a portion of the soil removed in forming the planting hole, depositing the crop seed, returning the remaining portion of the soil removed in forming the planting hole, and then tamping the returned soil to restore the capillary action of the soil. In the practicing of my method in fields not requiring fertilization the above steps of depositing fertilizer and partial returning of the soil removed in forming the planting hole may be dispensed with, and the planting hole formed only of a depth to provide for deposit of the crop seed for its proper germination and then return all the soil removed in forming the planting hole with or without tamping of the returned soil, as desired. However, tamping of the returned soil is preferred since it assures sufficient moisture for the germination of the seed by capillary action during a dry season or a season of meager rainfall.

In practicing my method in the raising of cotton, for example, an area of about ½" wide and 4¼" long is sufficient to effect planting of the cotton seed. The disturbance of this relatively small area will stir up some weed seed, but this area will be shaded by the emergence of the cotton foliage and normally prevents any obnoxious vegetation from growing to any damaging extent within this area. However, if desired the crop may be flame cultivated to destroy obnoxious vegetation growing in this area as soon as the cotton has grown sufficiently to permit flame cultivation thereof as described in my patent first above referred to.

Other objects and advantages of my invention will appear from the detail description.

Now, in order to acquaint those skilled in the art with the manner of practicing and utilizing my invention, I shall describe a preferred embodiment of the method of my invention, and in connection with the accompanying drawings describe a preferred embodiment of a planter constructed in accordance with my invention.

In the drawings:

Figure 3 is a chart showing the sequence of planting operations of the planter shown in Figures 1 and 2;

Figure 4 is an enlarged side elevational view of a portion of the planter shown in Figures 1 and 2 and illustrating the arrangement of parts for effecting the sequence of planting operation illustrated in the chart of Figure 3;

Figure 5 is a vertical cross sectional view through a completed seed bed provided by the method of my invention;

Figure 6 is an enlarged side elevational view of a planting unit of the planter of Figure 1 and illustrating in dotted lines portions of cam means provided to actuate the planting unit;

Figure 7 is an end elevational view of the planting unit shown in Figure 6;

Figure 8 is an enlarged side elevational view of the planting hole forming means and plunger means of the planting unit of Figure 7; and Figure 9 is a bottom view of that part of the apparatus shown in Figure 8.

Figure 1:
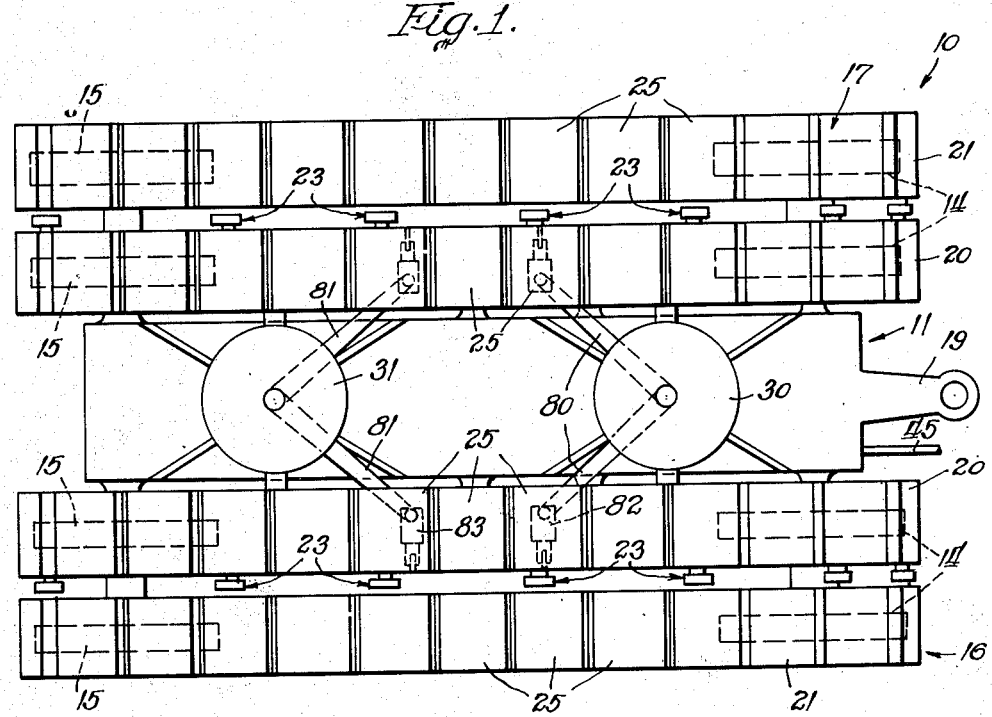
Figure 1 is a plan view of a planter adapted for use in practicing my present invention.

I have chosen for purposes of disclosing a specific embodiment of the method of my invention to describe it with respect to the planting and cultivation of cotton.

The first step of the preferred practice of the method of my invention follows the present practice of many growers of plowing the field in the fall or early winter season following the growing season of a crop, such as cotton. This plowing of the field may be carried out by any of the present practices in this respect, but the plowing should be of such character that the soil is turned and arranged so that the field is left substantially flat at any given portion thereof. As previously related it is now well known that a field by fall or early winter will have accumulated on its surface a large amount of weed seeds, and the plowing step referred to is effective to infest the ground with these weed seeds. Also, as is known, weed seed is quite hardy from the standpoint of cold resistance and a large amount of the seed will survive through the winter or a non-growing period for the field. In the case of cotton many of the plowed under weed seeds will begin to germinate from the six weeks to two months before normal planting time for the cotton seed. It is during this period when the obnoxious vegetation first appears that I propose as a second step of my invention to indiscriminately bathe the entire field with flames for destroying the obnoxious vegetation. Any suitable flaming apparatus may be provided for this purpose and in this connection the apparatus disclosed in my above mentioned patents can be employed for this purpose. In the apparatus of the patents above mentioned the burners are arranged in a particular manner with respect to each other to accomplish a particular method of flame cultivation of stemmed crops, but it will be understood that for purposes of flaming a field in accordance with my present invention that the burners need not occupy any critical relation or position with respect to each other than that they are preferably so arranged that relatively large areas of the entire field are caused to be flamed indiscriminately by the burners to facilitate as rapidly as possible the destruction of the obnoxious vegetation in the field. However, care should be taken that the apparatus used for flaming of the field does not unduly disturb the soil in that if this occurs other weed seed will be caused to be positioned where it may germinate and interfere with the crop subsequently to be raised in the field. This flaming of the field may be done as many times as necessary to effectively destroy the obnoxious vegetation before planting of the crop seed. Usually one to four flaming treatments of the field are sufficient to destroy all obnoxious vegetation by the flames by planting time.

The field is now ready for planting of the cotton seed and to achieve the most beneficial results of the aforesaid treatment of the field, planting of the cotton seed should be accomplished with a minimum amount of disturbance to the soil in order that other weed seed will not be brought to a zone of germination.

In the planting of cotton, I propose to place an appropriate number of seeds for each plant, spaced the proper distance from each other in row or drill without disturbing the soil for each plant in excess of an area of about ½" wide and 4¼" long and of the proper depth. The soil in this area will be disturbed and weed seed brought to a germination zone, but this area will be shaded in a short time by the foliage of the cotton plants which normally will prevent the obnoxious vegetation from growing in this area to any damaging extent to the cotton plants. The soil surrounding the planting area remains undisturbed and clean, and the cotton crop may grow without further cultivation. However, in the event obnoxious vegetation should deleteriously affect the growing cotton crop, the flame cultivation method of my patent first mentioned may be employed to effect destruction of such obnoxious vegetation. The prior flaming of the field before planting will enable the crop to attain sufficient size without interference from such obnoxious vegetation, but should it begin to appear the crop will have attained sufficient size to permit flame cultivating. Also in a very rainy season the prior treatment of the field will enable the crop to grow without being choked until such time as the crop may be flame cultivated to destroy any undue obnoxious vegetation. As disclosed in my patent last referred to, this step of cultivation of a cotton crop may be effected by directing a blast of flame upon the ground adjacent the plant to bathe the obnoxious vegetation and the stems of the standing plants in flame and removing the flame after the obnoxious vegetation is injured and before the plants receive substantial injury. A further description of this step of flame cultivation of the cotton crops is not believed necessary since it is now well known in the art.

In those instances of planting in which a cover crop is plowed under prior to planting of a spring crop, I prefer to flame the field in the manner previously described one or more times in the interval between plowing under of the cover crop and the planting of the crop seed. However, if desired, flaming of the field may be accomplished for the first time at the same time as the crop seed is planted as by flaming the field after deposit of the crop seed. This may be readily accomplished by providing the rear end of the planter with burners of the character described in my aforesaid patents to flame the seed bed and surrounding ground after its formation by the planter. Also, volunteer vegetation may be destroyed by flaming of the field after deposit of the crop seed and before it begins to sprout. As before, when the crop has grown to sufficient size it may be flame cultivated as above described if necessary.

It will thus be observed that the method of my present invention provides for preparation of a field for planting and the planting of seed in a manner in which an agricultural crop may be readily grown without being choked by obnoxious vegetation.

In the preferred practice of the method of my present invention I propose to accomplish planting of seed for each plant by the following successive steps. As previously related a planting hole substantially only of a size to effect planting of the cotton seed is first formed after which I propose to deposit in the planting hole a charge of fertilizer of any suitable known dry or fluid type. After deposit of the fertilizer in the planting hole a portion of the soil removed in forming the latter is returned to the planting hole. A portion of the soil removed in forming the planting hole is preferably returned thereto before deposit of the seed in order to provide a spacing of soil between the fertilizer and seed in that most presently known fertilizers, if in direct contact with the seed, will prevent its germination. The seed is then deposited in the planting hole. Then after deposit of the planting seed in the planting hole I propose to return the remainder of the soil removed in forming the planting hole. It is desirable to have a firm seed bed in order that the capillary action of the soil is restored to insure sufficient moisture for the germination of the seed in the event of the early planting season being dry or there being meager rainfall. A firm seed bed is attained by tamping of the soil after it has been returned to the planting hole. It will be understood that the cotton seed is planted in rows or drills in the usual manner of planting cotton, and after the cotton has grown to a fairly substantial size it may under circumstances, as previously described, be flame cultivated in accordance with my patent first mentioned herein.

The last described planting of crop seed may be readily accomplished with the apparatus shown in the drawings and which apparatus is the subject matter of my copending application Serial No. 765,433, filed August 1, 1947, now Patent No. 2,509,691 issued May 30, 1950, a division of my present application. The apparatus is shown somewhat diagrammatically, but discloses what I consider to be a preferred embodiment of my invention.

Figure 2:
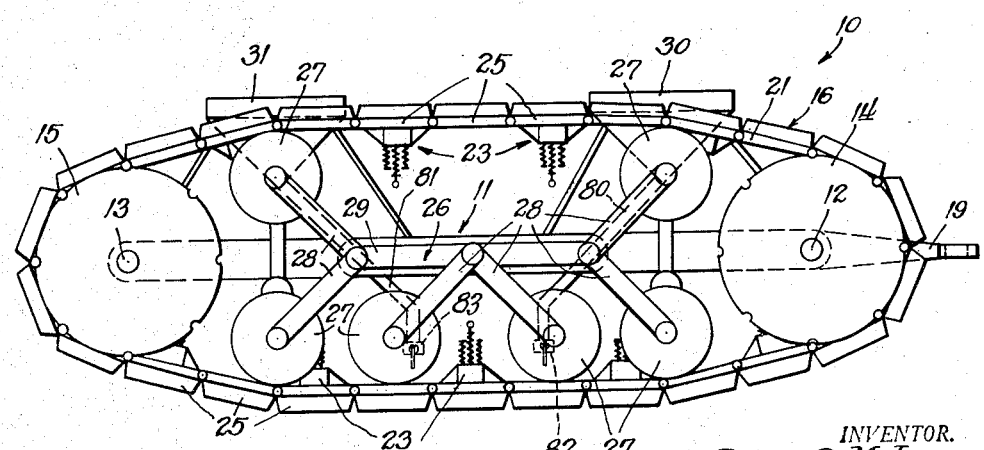
Figure 2 is a side elevational view of the planter shown in Figure 1.

Referring now to Figures 1 and 2 there is shown a planter suitable for accomplishing planting of cotton seed, or other suitable crop seed, with a minimum of disturbance to the soil. The planter of my invention comprises a vehicle 10 having a main frame 11 which at its forward and rearward ends provides for the support of transversely extending axles or sprocket supporting shafts 12 and 13, respectively, which have journaled thereon a number of forward and rearward sprockets 14 and 15, respectively, about which endless track means 16 and 17 are trained providing traction means for the vehicle. The forward end of the frame 11 is provided with draw bar member 19 by means of which the vehicle 10 may be hitched to a tractor or otherwise drawn along the ground. As shown more clearly in Figure 1, one each of the endless track means 16 and 17 is disposed at either side of the vehicle 10 and each comprises a pair of laterally spaced inner and outer endless tracks 20 and 21, respectively, with each of the endless tracks 20 and 21 being adapted to be trained over a pair of forward and rearward sprocket wheels 14 and 15 provided therefor. A plurality of planting units 23, shown diagrammatically in Figures 1 and 2, are adapted to be carried by each of the endless track means 16 and 17 at either side of the vehicle and are arranged so that they can effect planting of seed in rows between the spacing of endless tracks 20 and 21 of each of the endless track means 16 and 17 at either side of the vehicle. The endless tracks 20 and 21 of the track means 16 and 17, are of conventional construction and comprise pivotally connected tread members 25 with certain of the tread members 25 each being provided with a planting unit 23. Also, a conventional bogey construction 26 is associated with the vehicle 10 for maintaining the endless track means 16 and 17 taut in the travel of the tracks about the sprockets 14 and 15. This conventional bogey construction comprises a plurality of idler wheels 27 rotatably mounted and suitably supported by links 28 pivotally connected to a frame 29 to support the endless track means 16 and 17 from sagging and to keep the track means in alignment with the sprockets 14 and 15, as is well known in the art. Also, if desired, the planting units 23 may be constructed to connect the endless tracks 20 and 21 together across the spacing between the latter, or other suitable connecting means may be provided for this purpose.

It will be observed that in a vehicle of the type described in connection with Figures 1 and 2 that in the forward travel of the planter, the planting units 23 carried by the treads 25 of the endless track means 16 and 17 will remain stationary with respect to the ground for a predetermined length of time while the vehicle is moving forwardly. As will be hereinafter disclosed in detail it is while the planting units are in their relatively stationary position with respect to the ground that the operations necessary to effect planting of the seed are carried out. An essential feature of my invention is in providing a vehicle whereby a planting unit may remain stationary with respect to the ground for a predetermined length of time to effect planting of seed and not disturb the soil surrounding the immediate planting area, as is the case in prior forms of planters in which there is continuous movement between the planting mechanism and the ground.

While I have shown a single planting unit as extending the full length of tread member 25, it will be understood that the dimensions of the treads and of the planting unit may be proportioned so that the planting unit can be adjusted lengthwise of the endless track means 16 and 17 to provide for different hill spacings of plants. Likewise, the dimension of the treads may be suitably proportioned and the planting units 23 associated with certain of the treads to provide a desired spacing of the plants in a row. Also the axles or shafts 12 and 13 at the forward and rearward ends of the vehicle preferably are of a sufficient length to permit the axial adjustment thereon of the sprockets 14 and 15 so that the endless track means 16 and 17, together with the planting units 23 carried thereby along opposite sides of the vehicle may be brought closer together or spaced further apart to provide the desired distance between adjacent plant rows. The frame 11 also provides for support of a fertilizer hopper 30 and a seed hopper 31.

It will be understood that the endless track means 16 and 17 each comprising the pair of endless tracks 20 and 21 are of like construction and the description of my invention hereinafter will be limited to the track means 16 and the association of a planting unit 23 therewith, it being further understood that the several planting units 23 are all of the same construction.

Referring now to Figure 4 it will be observed that the frame member 11 provides for support of a planting unit actuating means 32 which comprises a frame member 33 extending lengthwise of the vehicle, which frame member 33 is disposed parallel with and below the frame member 11 between it and the lower run of the endless track means 16. The frame member 33 has a pair of forward and rearward links 34 suitably pivotally mounted in brackets secured thereto and which links at their other ends are pivotally connected to a bar 35 extending lengthwise and forwardly of the vehicle. A second pair of forward and rearward links 36 have pivotal connection to the bar 35 at the pivotal connections of links 34 thereto and the other ends of the links 36 are pivotally connected to brackets fixed to the frame member 11 of the vehicle 10. A pair of brackets 38 are also secured to the frame member 11 and each of the brackets 38 carries an adjustable stop member 39 for engaging the links 36 for limiting rearward rectilinear movement of bar 35. A pair of coil springs 40 are suitably connected at their opposite ends to the frame member 33 and the frame member 11 to normally urge the frame member 33 toward the frame member 11. The frame member 33 at its forward and rearward ends is provided with a pair of slots 42 into which guide arms 43 carried by the frame member 11 extend for guiding movement of the frame member 33 vertically relatively of the vehicle. The guide bars 43 are provided with stops 44 for limiting the upward movement of the frame member 33 by the springs 40. The forward end of the bar 35 has a handle or actuating member 45 pivotally connected thereto which extends forwardly of the vehicle. Upon the bar 35 being urged to the right by means of grasping the actuating member 45 in the position of the parts shown in Figure 4, the common pivotal axes of the links 34 and 36 upon the draw bar 35 will be drawn past center after which the springs 40 will be effective to raise the frame member 33 vertically upwardly to a position in which the stops 44 are engaged, which position of the frame member 33 as will be hereinafter described positions the planter actuating mechanism in its inoperative position so that the vehicle may be drawn or moved without actuation of the planting units 23. As shown in Figure 4, the frame member 33 has suitably secured to the under surface thereof a pair of lengthwise extending cam plate members 50 and 51, the functions and purposes of which will be described in detail hereinafter.

Reference may now be had to Figures 4, 6 and 7 from which it will be seen that the planting unit 23 comprises a funnel means 52 for guiding fertilizer and crop seed into a planting hole to be formed between the spacing of endless tracks 20 and 21, which is formed by a pair of funnel members 53 and 54 carried, respectively, by opposed tread members 25 of the endless tracks 20 and 21 of the endless track means 16 in opposed relation with respect to each other. The funnel members 53 and 54 are of like construction and are preferably made of sheet metal and each comprises an inclined wall 55 extending diagonally downwardly and inwardly from the upper outer edges thereof to the spacing between the endless tracks 20 and 21, and a pair of end walls 56 extending diagonally downwardly and centrally toward each other from the upper end edges of these members. A planting hole forming means is indicated generally at 60 and comprises a vertically reciprocal shovel or hole digging member 61 which for the planting of cotton seed is preferably approximately 4¼" in length and ½" in width. The shovel 61 is provided with a valve means 62 at its lower end, which valve means will be described in detail hereinafter. A pair of vertically extending rods 63 are threaded at their inner ends into the upper closed end of shovel member 61. Coil springs 65 are confined between enlarged heads 66 at the upper ends of the rods 63 and a pair of flange members 67 carried by the pair of spaced shovel supporting frame members 68 to receive therebetween the shovel 61, which shovel supporting frame members 68 are provided with laterally inwardly extending flanges 69 which are suitably secured to the track tread 25 of the inner endless track 20 of the track means 16. The frame members 68 provide for support of the planting hole forming means 60 above the space between the pair of spaced endless tracks 20 and 21. The coil springs 65 normally provide for positioning of the shovel 61 in the position shown in Figures 6 and 7 wherein it is spaced above the ground. The shovel 61 is provided with a pair of ears 70 which as shown more clearly in Figures 8 and 9 provide for guiding of the shovel in its vertical movement by vertically extending guide slots formed in vertical frame members 72 disposed along the vertical end edges of shovel 61 and secured between frame members 68 and backing panel 73. A shovel cam follower 74 is suitably supported adjacent the upper end of the shovel 61 and is adapted to be engaged by the shovel control cam 51 for effecting vertical reciprocal movement of the planting hole forming means 60. A plunger means 75 is mounted for vertical reciprocal movement in the shovel housing 61 and comprises an end plate member or piston 76 suitably secured to the lower end of a vertically extending rod 77 which at its upper end provides for support of a plunger cam follower 78 which is adapted to have engagement with the cam surfaces of the plunger operating cam 50. A coil spring 71 is disposed about rod 77 and normally provides for positioning of the plunger means 75 in its uppermost position in which the piston 76 is positioned at the upper end of shovel 61. A pin 79 carried by rod 77 extends laterally inwardly of the endless track 20 and serves as a trip arm for causing delivery of fertilizer and crop seed to the funnel means 52 of a planting unit 23. Referring again now to Figures 1, 2 and 4, it will be observed that flexible conduits 80 and 81 extend from the fertilizer hopper 30 and the seed hopper 31, respectively, to dispenser devices 82 and 83, respectively. The dispenser devices 82 and 83 are of known construction and when tripped are adapted to deliver a predetermined measured amount of fertilizer and seed, respectively. As shown more clearly in Figure 7, the fertilizer dispenser 82 has a discharge conduit 84 extending therefrom, which is adapted to discharge fertilizer into funnel member 53. A shaft 85 extends laterally outwardly of the dispenser 82 and at its end is formed with a trip arm 86 which when tripped by the pin 79 carried at the upper end of the rod 77 actuates the fertilizer dispenser means 82 to effect discharge of fertilizer from the fertilizer hopper 30 through the discharge conduit 84 and into the funnel member 53 of planting unit 23. The seed dispenser unit 83, like the fertilizer dispenser unit 82, is provided with a trip arm 90 adapted to be engaged by the pin 79 at the upper end of rod 77 to discharge seed into funnel member 53 of the funnel means 52 of a planting unit 23.

Reference may now be had particularly to Figures 8 and 9 for a description of the valve means 62 at the lower end of the shovel housing 61 of the planting hole forming means 60 of my invention. It will be observed that valve means 62 comprises a pair of plate valve members 92 and 93 pivotally mounted along their outer side edges about a pair of pins 94 and 95, respectively, which are supported in spaced bearing supports 96 formed integrally of the side walls of the shovel at their lower ends. Each of the valve members 92 and 93 is also formed with spaced bearing supports 97 fitting about pins 94 and 95 between the bearing elements 96 of the side walls of shovel 61, and a pair of coil springs 98 for each valve plate are disposed about the pins 94 and 95, respectively, between certain of the spaced bearing supports 96 and 97 of the shovel and valve plates. One of the ends of each of the coil springs is secured to the valve plate members 92 and 93 in clips 99 formed by spaced slits in the valve plates, and the other ends of the springs are fixed in clips 100 suitably formed by spaced slits in the side walls of the shovel 61. The arrangement of the springs is such that they normally maintain the valve plates 92 and 93 in horizontal position, but provide for swinging thereof inwardly and outwardly of the shovel 61, to provide for the admission of soil into the shovel housing 61, and for the discharge of soil therefrom, as will more fully appear hereinafter in describing the mode of operation of my planter.

For purposes of explaining the operation of the planter of my present invention reference may now be had particularly to Figures 3, 4, and 5. After the planter has been brought to the field and it is desired to effect planting of seed, the handle member 45 is urged to the left, as viewed in Figure 4, to effect movement to the left of the bar member 35 to position the planter unit actuating mechanism 32 in the position shown in Figure 4. With the planter unit actuating mechanism 32 in this position it will be observed that as a planting unit 23 assumes a stationary position relative to the ground and during forward movement of the vehicle that the plunger operating cam 50 and the shovel control cam 51 will engage the cam follower 78 of the plunger actuating means 75, and the cam follower 74 of the planting hole forming means 60, respectively. Thus in stage I, indicated in Figure 3, the cam surface 101 of the shovel control cam 51 engages the cam follower 74 of the planting hole forming means 60 which drives the shovel 61 into the ground and forms the planting hole 102. During this downward vertical movement of the shovel 61, the plate valve members 92 and 93 pivot inwardly of the shovel housing to admit the soil to be removed in forming the planting hole, and after the cam follower 74 passes the high point of the cam surface 101 it comes into engagement with the cam surface 103 enabling the pair of coil springs 65 to raise the planting hole forming means 60 above the surface of the ground to the position shown in Figure 4. This raising of the shovel 61 is indicated as stage II in the chart of Figure 3. As the shovel 61 is being raised from the planting hole 102 the valve plates 92 and 93 are caused to return to their normal horizontal position by tension created in springs 98 by the pivoting inwardly of the valve plates to close the bottom of the shovel and retain therein the soil removed in forming the planting hole. Now, as the vehicle 10 proceeds to move forwardly the pin 79 carried at the upper end of the plunger rod 77 engages the trip arm 86 causing rotation of the shaft 85 to effect actuation of the fertilizer dispenser 82 to discharge fertilizer through conduit 84 into the funnel means 52 of the planting unit 23 which is caused by the latter to be discharged into the planting hole 102, as illustrated by stage III in Figure 3. Now, as the vehicle proceeds to move forwardly the cam surface 105 of the plunger operating cam 50 is caused to engage the plunger cam follower 78 carried at the upper end of the plunger rod 77 to effect a first stage partial discharge of soil in the shovel 61 into the planting hole 102 and on top of the fertilizer as indicated by stage IV. After the high point of cam surface 105 passes the cam follower 78 it returns to the original position in engagement with the cam surface 106 of the plunger operating cam 50. The downward movement of the rod 77 causes the end plate or piston 76 of the plunger means to force soil in the shovel 61 outwardly through the valve plates 92 and 93 at the lower end thereof. The spring 71 carried by the cam plunger rod 77 returns the plunger rod 77 and piston 76 to the upper position in the shovel 61 and the coil springs 98, which have been tensioned by the outward pivotal movement of the valve plates 92 and 93, again return the latter to their normal horizontal position to retain the remainder of the soil in the shovel removed in forming the planting hole 102. Thereafter, as indicated by stage V, the pin 79 carried at the upper end of the plunger arm 77 engages the trip arm 90 of the seed dispenser mechanism 33 providing for discharge of seed from seed hopper 31 into the funnel means 52 of the planting unit 23 to effect deposit of seed in the planting hole. Then in the continued forward movement of the vehicle the cam follower 78 is engaged by the cam surface 107 of the plunger operating cam 50 to effect the stage VI of the planting operation, which engagement of the cam surface 107 with the follower 78 causes movement of the piston 76 substantially entirely through the shovel 61 to discharge the remainder of the soil into planting hole 102 removed in forming the same. Thereafter in the continued movement of the vehicle the cam surfaces 108 and 109 successively engage the cam follower 78, as illustrated by stage VII, to first position the piston 76 at the end of the rod 77 substantially even with the edges of the opened valve plates 92 and 93 to firm the soil returned to the planting hole at substantially the level of the ground, with the cam portion 109 being effective for projecting the piston 76 at the end of rod 77 beyond the edges of the outturned valve plates 92 and 93 to firmly pack or tamp the soil returned to the planting hole, preferably an amount so that the upper surface of the planting hole is slightly below the level of the ground as shown in Figure 5 of the drawings. After the above sequence of operations have been effected by the several cam surfaces of the shovel control arm 51, and the plunger operating cam 50, the cam followers 78 and 74 follow the cam portions 112 and 113 of the cams 51 and 50, respectively, to return the planting hole forming means 60 and plunger means 75 to their initial positions. This is indicated at stage VIII of Figure 3. After the planting unit 23, shown in Figure 4, has been actuated through the several stages described above it approaches the rearmost sprocket 15 and again travels thereabout in the forward movement of the vehicle. However, since several planting units 23 are associated with the endless track means 16 and 17, it will be observed that the planting unit actuating means 32 is effective to successively actuate the planting units while the latter are in stationary position relative to the ground and during forward movement of the vehicle.

It will be observed that if desired the outer track sections 21 of the endless track means 16 and 17, together with the funnel members 54 carried thereby and the sprockets 14 and 15 provided therefor, may be dispensed with if desired in which case the funnel members 53 of each of the planting units 23 would provide for guiding fertilizer and seed into the planting holes.

In connection with the preparation of the seed bed, it is well understood by those skilled in the art that after a field is plowed and harrowed or otherwise treated to break up the clods of soil for pulverization of the same, with or without packing as by a roller or the like, seeds of volunteer vegetation such as we may call "weeds," will start upon the first occasion. Usually, this involves a certain ground temperature, and sufficient moisture to stimulate the seed into activity.

Since the volunteer seeds are already present in the soil while it is being worked, they invariably have the first opportunity to sprout and will get ahead of the crop plants the seeds for which necessarily are deposited after the field is prepared. It is desirable in the practice of flame cultivation that there be a substantial differential between the volunteer vegetation and the crop plants. The above described method of flaming of the seed bed before, during or after planting the crop seeds is highly desirable and effective to secure a differential of growth between the two types of vegetation.

In the destruction of the volunteer vegetation it is not essential that the entire area be flamed, since the space between the rows is capable of being cultivated mechanically if desired, either before or after the sprouting of the crop seeds. However, the flaming of the row where the crop seeds will be or are planted is an essential feature of this method of preparation of the seed bed.

In the specification, and in the following claims I employ the term "flaming" to designate the application of heat at sufficiently high temperature to destroy the volunteer vegetation. This may be the application of a naked flame, as above discussed, or it may involve the generation of hot gases by combustion in a chamber designed for efficient production of combustion and the products at a suitable temperature high enough to perform destruction of the volunteer vegetation may be projected upon the said volunteer vegetation by suitable delivery mechanism which may include blowers, conduits and nozzles. The point is that in such case more efficient combustion may be carried on in a chamber especially designed for the same than where the naked flame is applied to the relatively cold materials to be destroyed.

Instead of hot dry gases a combination of gases and vapors or of vapor alone may be formed or produced and discharged upon the volunteer vegetation to secure the desired destruction of the same. Heat may be applied in other ways, such as by radiant heat or other means and modes of developing the injurious application of heat to the volunteer vegetation. So far as I am aware, the concept of preparing a seed bed and allowing the volunteer seeds to sprout, and then to be killed off without disturbance of the soil prior to or after planting is a broadly new concept.

Plowing as such is not an essential step in the preparation of the seed bed, but it is a common method of aerating and loosening the soil. The significant feature, so far as concerns the present invention is that it brings within the necessary sprouting distance from the surface additional weed seeds which have been in the soil previously. Any weed seed which comes within about one half inch of the top surface of the soil will sprout and grow into a plant if allowed to do so. Seeds at a greater depth will not sprout, but will await a favorable opportunity to germinate later. It is a part of the inventive concept that the weed seeds which are to be defeated shall not only germinate, but grow to such a size of shoot that if they are killed off the weeds cannot support another start. In other words, the concept is to catch the weed seed at the greatest disadvantage, namely, when it has expended itself in starting a plant which is however small, and peculiarly vulnerable to the application of heat as practiced in the flaming method above described.

While I have disclosed what I consider to be the preferred embodiments of my invention, it will be understood that various modifications and rearrangements may be made therein without departing from the spirit and scope of my invention as defined in the appended claim.

I claim:

The method of starting crops planted from seed in a growing season in order to gain an advantage in growth of the crop plants over weeds and other volunteer vegetation which comprises breaking and aerating the top soil and leveling the surface of a tract of ground whereby weed seeds are brought close enough to the surface to germinate, thereafter depositing crop seeds in the said ground in separate hills of small area without substantial disturbance of the soil over the remainder of the area of the tract, and invariably before sprouting of the crop seeds, flaming the surface of the tract to kill the sprouted weeds and other volunteer vegetation over the entire area in which the crop seeds are located, whereby the crop plants gain a growth advantage over weeds and other volunteer vegetation.

PRICE C. McLEMORE.

REFERENCES CITED

The following references are of record in the file of this patent:

UNITED STATES PATENTS

| Number | Name | Date |
| --- | --- | --- |
| 678,468 | Harpold | July 16, 1901 |
| 701,011 | Rohmer | Sept. 30, 1902 |
| 935,546 | Pine | Sept. 28, 1909 |
| 1,226,515 | Hicks | May 15, 1917 |
| 1,901,299 | Johnson | Mar. 14, 1933 |
| 1,956,697 | Rognerud | May 1, 1934 |
| 2,159,652 | Brunner | May 23, 1939 |
| 2,327,204 | McLemore | Aug. 17, 1943 |
| 2,369,154 | McLemore | Feb. 13, 1945 |